Feb. 28, 1950         R. E. FEARON         2,499,020
GAS ANALYSIS
Filed March 31, 1944         2 Sheets-Sheet 1
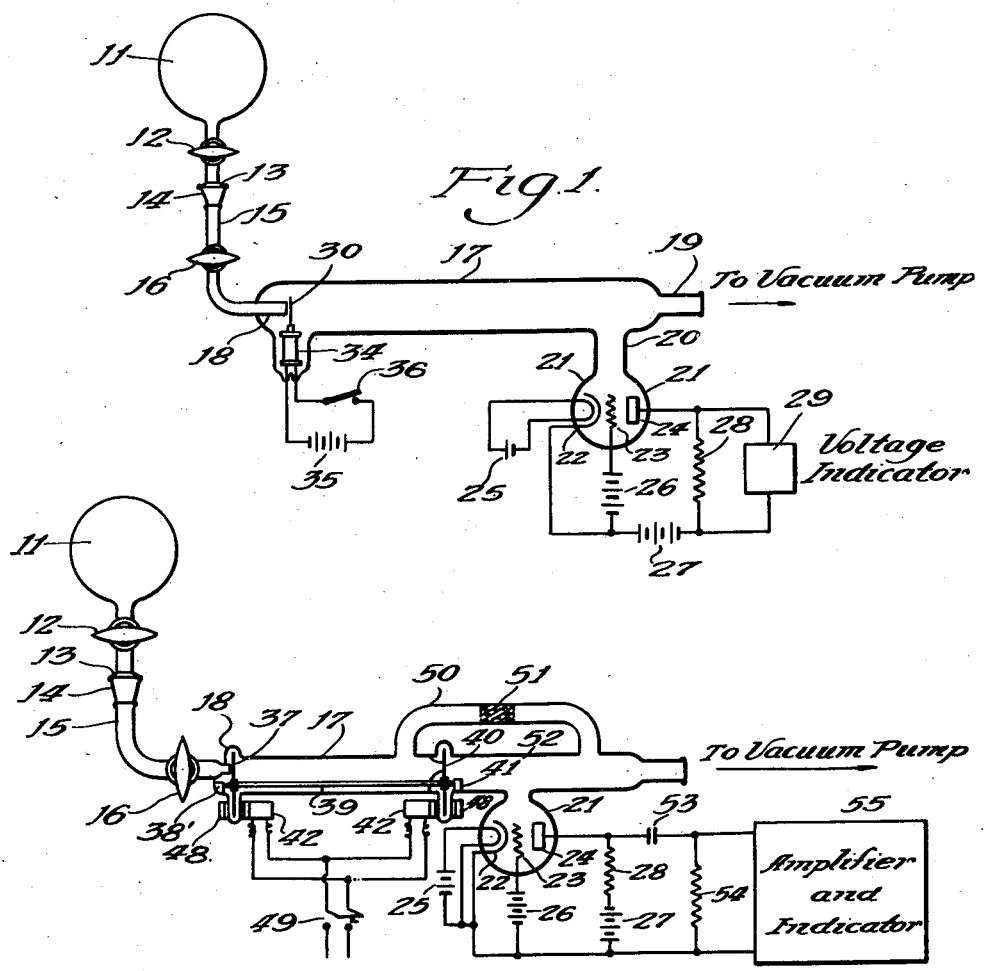
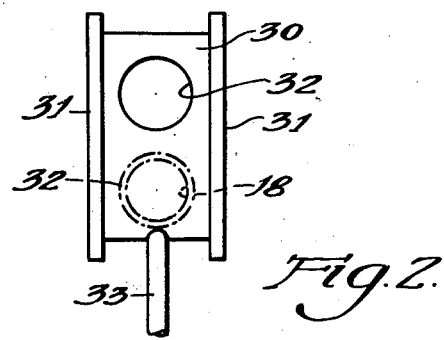
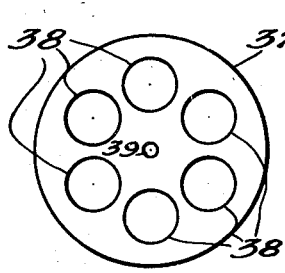
Inventor:
Robert E. Fearon
By: Paul F. Hawley
Patent Agent Feb. 28, 1950 R. E. FEARON 2,499,020
GAS ANALYSIS
Filed March 31, 1944 2 Sheets-Sheet 2

Inventor:
Robert E. Fearon
By: Paul F. Hawley
Patent Agent

Patented Feb. 28, 1950

2,499,020

UNITED STATES PATENT OFFICE 2,499,020

GAS ANALYSIS

Robert E. Fearon, Tulsa, Okla., assignor to Stanolind Oil and Gas Company, Tulsa, Okla., a corporation of Delaware Application March 31, 1944, Serial No. 529,004

8 Claims. (Cl. 73—23)

This invention relates to gas analysis generally and particularly to a method and means for separating out the constituents of a mixture of gas for analysis without the necessity of ionizing the gas.

It is an object of this invention to provide a gas analysis method and apparatus which is characterized by extreme simplicity. It is a further object of this invention to provide such a system in which the various constituents of a gas mixture can be analyzed either discontinuously or continuously. Another object of this invention is to provide such a system in which the separation of the various constituent gases is carried out substantially free from any ionization process. Other objects and advantages of this invention will become apparent from this specification.

It is known that the average velocities of molecules in temperature equilibrium are inversely proportional to the square roots of their molecular weights. If, in a high vacuum, a molecule of a given molecular weight is admitted to the end of an elongated cylindrical tube, there will be a redistribution of the average position of this molecule with time. Originally, the molecule was at the end of the tube, but as time passes the likelihood of its being at other places along the tube will increase, and will include also, a chance that it will escape from the distant end of the tube.

If several molecules are introduced instead of only one, these molecules will gradually escape from the distant end, and the time after their introduction at which they begin to escape will depend on their thermal velocities. Thus molecules having a very low molecular weight will escape from the distant end on the average sooner than molecules of high molecular weight. Accordingly, if one introduces at the starting end of the tube a considerable number of molecules of several kinds, the composition of the mixture escaping at the distant end varies with time, containing at first more of the components of low molecular weight and later more of the components of higher molecular weight. For each component there is a certain time after the introduction of the original mixture at which the percentage of this component in the mixture emerging from the far end reaches a maximum. Such time is different for each of the several components, coming earlier for the light components and later for the heavier ones. The whole process is accelerated if the tube is heated. The above discussion has, as is obviously the case, been concerned with gases at low pressures—pressures sufficiently low that the usual laws of flow of gases in a tube are replaced by a ballistic situation of many little "elastic" molecules ricochetting in a statistical manner against the walls, and usually crossing the interior without colliding with other molecules. Such pressures are of the order of less than 0.01 mm. of mercury, but it will be apparent from the description to follow that this upper limit is in no sense fixed, but must depend on various factors of instrument design such as dimensions, clearances, and the like. In general, the larger the instrument dimensions, the lower this pressure limit must be.

I have discovered a new and novel system for gas analysis which makes use of the properties of gas just described. This system is particularly adapted to the analysis of simple mixtures of gases containing relatively few components although some of the advantages of the equipment can also be obtained in the analysis of gaseous mixtures containing a large number of constituents. This system possesses a definite advantage over the types used in the past in several regards. In the first place it is adaptable for the analysis of gaseous components which are not easily absorbed or chemically combined in the conventional Orsat gas apparatus or similar systems. In the second place, it has an advantage over analysis by the use of the mass spectrometer in its simplicity, requiring much less attention, and in addition it does not depend upon the relative ionization properties of the various constituents, which always has been an inherent disadvantage in any type of mass spectrometer, since a gas of low ionization properties is difficult of detection in the mass spectrometric system of operation. This difficulty is not present in my system of analysis.

For simplicity in discussion, several embodiments of the invention are shown in the accompanying drawings which form a part of this specification and are to be read in conjunction therewith. These drawings are to be considered as illustrative rather than limiting the scope of the invention. In the drawings:

Figure 1 represents a diagrammatic cross section of one simple form of gas analysis apparatus in accordance with my invention;

Figure 2 illustrates a part of a shutter used in the apparatus of Figure 1;

Figure 3 represents a cross section of a second type of gas analysis apparatus;

Figure 4 is a view of a rotating shutter employed in the apparatus of Figure 3;

Figure 5:
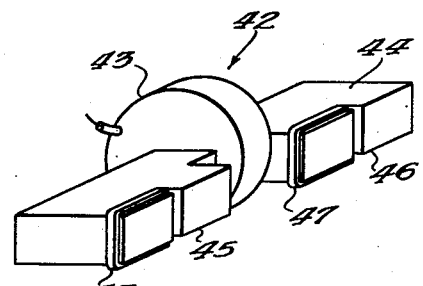
Figure 5 represents an isometric view of the electric means used for rotating the shutter of Figure 4.

In Figure 1 a gas sample to be analyzed is obtained by conventional means within a sample container 11, which is furnished with a stop cock 12 and a standard ground joint 13. This standard ground joint 13 cooperates with a similar ground joint 14 on inlet tube 15, which preferably is likewise furnished with a valve 16. Inlet tube 15 is led through a gas-tight seal into an elongated tube 17 which is equipped at the opposite end from the gas intake 18 with a connection 19 to evacuation apparatus capable of maintaining a vacuum of the order of less than 0.01 mm. pressure, and preferably considerably less than this value, in the tube 17. Near the connection 19 is located a side arm 20 to the tube 17, in which is found a conventional pressure gauge, for example an ionization gauge 21. As is well-known in this art, such an ionization gauge can be made up like a simple triode vacuum tube with cathode 22, grid 23 and plate 24. The cathode is heated by a source of E. M. F. 25. The grid of the ionization gauge is preferably maintained at a positive potential by a source of voltage 26 while the plate is maintained at a negative potential by a source of voltage 27, the source being applied to the plate through a resistor 28. Across the resistor 28 is connected an electrical indicator 29 which may be a vacuum tube voltmeter, recording voltmeter, or the like, which produces a visual indication of the voltage drop across resistor 28, and hence produces an indication of the pressure within the ionization gauge. The operation of such an instrument has been described many times in the literature.

Immediately in front of the end of the intake tube 18 is located a shutter 30. This shutter is sufficiently close to the end of tube 18 so that at the pressure prevailing on the inside of tube 18 very little gas is able to leak into the long tube 17. The shutter 30, as is more clearly shown in Figure 2, is preferably supported between a pair of guides 31 which are mounted on the tube 17. The shutter is equipped with an orifice 32 which preferably is of the order of the diameter of the end of tube 18. The shutter 30 is attached by a rod 33 to a solenoid 34, the leads of which pass out through vacuum tight seals in the walls of tube 17 and are connected to a source of voltage 35 and a switch 36. When switch 36 is closed, the shutter 30 is pulled by the magnetic force acting through solenoid 34, thus abruptly placing orifice 32 opposite the end of tube 18, and permitting gas to enter the tube 17. Preferably the shutter is opened during a short predetermined period of time, so that only a relatively small quantity of gas is admitted to the end of tube 17, all at approximately the same instant. The molecules in this gas now move through the chamber 17 towards the vacuum pump. As already discussed, the composition at any particular zone in tube 17 varies with time, containing at first more of the components of low molecular weight and later more of the components of high molecular weight. The voltage indicator 29 connected to the ionization gauge 21 is employed to record the variation in pressure at the opposite end of the tube 17 and hence, after the operation of shutter 30, it will show a built-up of pressure to a first maximum characterizing the quantity of the lowest molecular weight constituent of the gas originally in container 11 and subsequently will show maxima for other materials of higher molecular weight. The time at which these maxima arrive at the voltage indicator relative to the actuation of the shutter 30 is indicative of the molecular weight of the material, and the height of each of these peaks is indicative of the quantity of gas present.

Calibration of the instrument is preferably carried out by the usual analytical technique of first applying the instrument to the analysis of each of a series of pure gases, followed by analysis of mixtures of such gases wherein the concentration of each constituent is known. From these data it is possible to determine by comparison with the record of the variations in pressure due to the constituents of the sample of unkown gas, as to what constituents are present and what are the concentrations of these constituents. It is therefore apparent that it is advantageous that the voltage indicator 29 be a recording type indicator, the recording being carried out against time.

It is possible to obtain more exact analyses on gaseous mixtures by a modification of this system which is shown diagrammatically in Figure 3. In this apparatus the admission of gas into the tube 17 is carried out periodically in a cyclic fashion. This can be accomplished in the apparatus shown by replacing the shutter 30 shown in Figure 1 with a rotatable shutter 37 shown in Figure 4. This shutter is provided with a number of orifices 38, preferably of identical size and placed at equal angles around the shutter. This shutter is mounted between a bearing 38' inside of the tube and a rod 39 which at the other end passes through a second shutter 40 of similar construction and to a bearing 41. The walls of tube 17 are extended adjacent the shutter 37 and are constructed at least in this region of a relatively non-conducting material. A magnet system 42 supplied with alternating current from a suitable source, for example the usual 60 cycle power mains, is located as close as possible to the shutter 37, as shown in Figure 3.

The details of one such suitable system are shown in Figure 5. Here it is seen that the magnet system is composed of a coil 43, the terminals of which are connected to the alternating current supply, and an iron core 44, preferably laminated. This iron core has two pole faces indicated generally at 45 and 46, which pole faces are placed as close as possible to the shutter 37. Each of these pole faces is supplied with a shading coil 47.

As is well known, the magnetic field in each of the pole faces 45 and 46 due to the alternating current in coil 43 produces a gliding magnetic flux. When this magnet system 42 is placed close to the shutter 37, it produces a torque in this shutter tending to make it rotate. This effect is increased by placing a bar of laminated steel 48, of approximately the length of the magnet system 42 on the opposite side of the shutter 37 from the magnet system. A similar magnet system is applied close to the second shutter 40, so that by closing switch 49, the two shutters revolve in the evacuated chamber 17, periodically placing orifices 38 opposite the ends of the tube 17.

Tube 17 is continuously evacuated through tube 50 which preferably has placed in it a permeable baffle 51 which may be of glass wool, unglazed porcelain or the like, so that when shutter 40 opens, the gas near the right end of tube 17 can pass more easily through the tube 52 than through tube 50. Tubes 52 and 50 can be joined together, if desired, at a point sufficiently removed from the location of the ionization apparatus 21 so that there is relatively little diffusion of gas from the right end of tube 50 back to this pressure gauge. The ionization or pressure gauge 21 is constructed in the same fashion as that already described in connection with Figure 1, with the exception of the fact that the output of this meter is coupled through a coupling condenser 53 and resistor 54 to the input of an amplifier and indicator 55. Preferably this meter is placed in tube 52 close to the opening for shutter 40.

In operation the valve 16 is initially closed and the system up to the valve is evacuated to a pressure at least as low as 0.01 mm. of mercury, and preferably considerably lower than this figure. Stop cocks 12 and 16 are then opened slightly and switch 49 is closed, revolving the two shutters 37 and 40. Gas is admitted to the end of the elongated tube 17 periodically as the orifices in shutter 37 come opposite the end of tube 18. This gas is therefore abruptly admitted in the form of puffs or bursts of gas, which diffuse down the chamber 17. A large portion of this gas escapes through tube 50. However, whenever an orifice in shutter 40 comes opposite the end of tube 17, the gas which is adjacent the end of this tube passes through the shutter, thus appearing adjacent the pressure indicator or ionization gauge 21. The composition of the gas passing through shutter 40 depends upon the diffusing properties of the constituents of the gas in tube 17 and upon the time after each opening of shutter 37 at which shutter 40 opens. Accordingly, by adjusting the frequency of the alternating current supply feeding the magnet system 42, the speed of rotation of the shutters can be adjusted, thus determining the length of time between openings of shutter 37 and shutter 40. This time is also affected by the relative orientation of orifices in shutters 37 and 40. It is apparent that by suitable adjustment of the supply frequency, this time can be varied within wide limits so that the gas sample removed through shutter 40 can be chosen to be a relatively light molecular weight constituent of the gas, or a more heavy fraction, depending on whether this time interval is short or long. The gas which is not removed through shutter 40 is removed through tube 50, thus continuously maintaining tube 17 in an evacuated condition.

The gas which passes through shutter 40 is in the form of short bursts or puffs of gas producing a pulsating pressure which is measured by the ionization gauge 21 and indicated by the amplifier and indicator 55. The time lag, which is determined by the speed of rotation of the shutters, determines the average molecular weight of the constituent which is being analyzed, and the amplitude of the pressure produced is an indication of the quantity of that constituent.

Calibration of this apparatus is carried out in the same manner as that described in connection with Figure 1, i. e. the apparatus is first used on a sample of pure gas of known composition and the optimum time lag between openings in shutters 37 and 40 to obtain maximum pressure at gauge 21 is determined by varying the frequency of the alternating current supply to the magnet systems and observing the pressure variation. The apparatus is thereafter similarly used with samples of other pure gas until the frequency of the alternating current supply, i. e. speed of rotation of the shutters, has been correlated against the average molecular weight of the gas fraction to be analyzed. After this, the apparatus can be used with any unknown gas and the analysis in terms of molecular weight merely becomes a matter of measuring the pressure in tube 52 in terms of the speed of rotation of the shutters 37 and 40.

Figure 6:
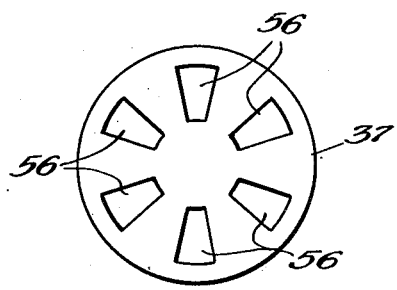
Figure 6 represents an alternative form of the shutter shown in Figure 4.

The shape and size of the orifices in the shutters 37 and 40 are a matter of choice. One desirable alternative to the round orifices shown in Figure 4 is the so-called segmental orifice shown in Figure 6. Here the sides of the orifices are shown to be straight lines, thus giving a more abrupt shut-off and opening of the orifices than is the case with the round orifices shown in Figure 4.

Figure 7:
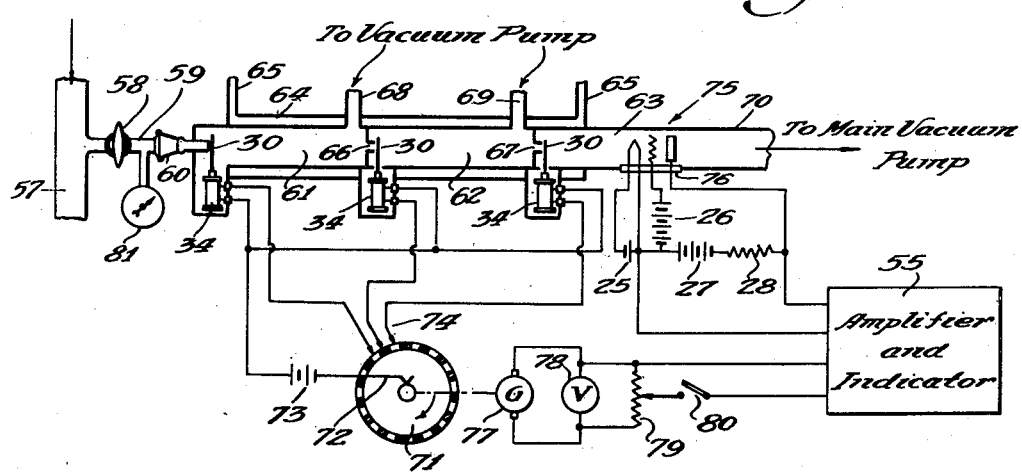
Figure 7 represents diagrammatically a third embodiment of the invention.

A third form of this gas analysis apparatus is shown in Figure 7. In this case the analytical apparatus is connected to a gas line 57 through a valve 58 and a tube 59 furnished with a standard ground joint adapted to cooperate with a second ground joint 60 of the analytical apparatus. The apparatus shown in Figure 7 includes a plurality of elongated zones, in this case 61, 62 and 63, connected in series. These zones have been surrounded by a jacket 64 provided with inlet and outlet tubes 65 by means of which the walls of the tube can be maintained at a desired temperature. This jacket, it should be mentioned, can be employed with the apparatus shown in Figure 1 or in Figure 3. A baffle 66 is provided between zones 61 and 62 and a second baffle 67 is located between zones 62 and 63. Each of these is supplied with an orifice, immediately adjacent which is a shutter 30. The intake tube 60 is likewise provided with a shutter 30. These shutters may be of the type shown in Figure 2, for example, in which case they are provided with solenoids 34. The leads to these solenoids are brought out through vacuum-tight seals in the walls of the chamber. Each of the elongated zones is provided with an evacuation system connected, respectively, to lines 68, 69 and 70. The gas removed through the side tubes 68 and 69 (located close to the shutters) may be discarded, while that removed by the main vacuum pump through line 70 is the stream which is to be analyzed. The three shutters 30 are arranged to be energized in turn so that a small portion of gas from the gas line 57 is first admitted to zone 61, a selected portion of it is transferred into the succeeding zone 62 by action of the shutter 30 adjacent baffle 66, and in turn a selected portion of this gas is transferred to the final zone 63 by operation of the shutter 30 adjacent baffle 67. The gas is thus introduced into each of these chambers in a short time interval, after which the entry of further gas is shut off.

The time at which the respective shutters are operated can be adjusted by any of a number of well known electric circuits, that shown in Figure 7 being one possible choice. In this figure, a rotated commutator 71 is employed. The outer surface of this commutator is composed alternately of conducting and non-conducting segments, the conducting segments being connected in common to the center part where a brush 72 makes connection with them. This brush is connected to a source of electrical energy 73 which is a common source of energy for all these solenoids. Three brushes 34 bear against the circumference of the commutator and are connected respectively to the first, second and third solenoids shown. The direction of rotation of the commutator 71 is such that the solenoid 34 located adjacent the intake tube 60 is energized first, and then at a time determined by the speed of rotation of the commutator 71 and the closeness of orientation of the first two brushes 74, the second solenoid is energized. The second solenoid is energized in a similar fashion, again after a lapse of a predetermined time determined by the speed of rotation of commutator 71 and the spacing of the second and third brushes 74. It is apparent, therefore, that the gas which is transferred from zone 61 to zone 62 is that which diffused through this elongated zone in a predetermined time, i. e. the time between the actuation of the first and second shutters. The gas which passes out of zone 62 into zone 63 diffused through this zone 62 in a predetermined period which may be, but is not necessarily, equal to the time that the sample of gas passed through the zone 61. The apparatus shown in Figure 7 has an advantage over that shown in Figure 3 in that here there is a double selection of the diffusing gas, whereas in effect there was a single selection in the apparatus shown in Figure 3. It is also apparent that this system can be used as a means of purification or selection of one constituent in a gas stream containing several constituents.

The pressure of the gas in zone 63 is indicative of the amount of the doubly selected constituent which diffused through the apparatus, and the time lag at which the shutters operated to produce this gas is indicative of the molecular weight of the gas. The pressure is determined in this apparatus by an ionization gauge, indicated generally by numeral 75 which is built into the main tube through a removable insulated section 76. The output of this ionizating gauge is applied to amplifier and indicator 55 which may typically include a time recorder or oscillograph. In order that a recording be also made of a quantity proportional to the speed of the commutator (which for a given position of the brushes 74 determines the average molecular weight of the sample selected for analysis), a direct current generator 77, which preferably has a constant strength field for instance a field due to a permanent magnet, is connected to a voltmeter 78 to produce a visual indication of the speed, and to a voltage divider 79 which is connected through a switch 80 to the amplifier and indicator 55. Thus if the indicator includes a two element oscillograph, one element is utilized to indicate the pressure in zone 63 and the other is used to record a quantity directly proportional to the speed of the commutator 71. In order to change the time lag between removal of gas from the various zones, it is merely necessary to change the speed of the commutator 71.

It is desirable to introduce the gas into the analytical system at a constant pressure. This can be accomplished in the apparatus shown in Figure 7 by the use of a pressure indicator 81 connected to the input system, valve 58 being manipulated to maintain this constant pressure. A similar arrangement can be incorporated into the systems shown in either Figure 1 or Figure 3.

A wide variety of apparatus can be constructed in accordance with the principles described. The invention is not limited to the systems shown, which are merely for purposes of illustration, but is best set out in the scope of the appended claims.

I claim:

1. The method of analyzing a mixture of substances in the gaseous state for at least one of its components including the steps of introducing a portion of said mixture into an evacuated zone during a short, predetermined interval of time, and without ionizing any of said mixture determining at a substantial distance from the region of entry of said portion into said zone the resultant variation in pressure in said zone, as a function of time.

2. A method for the analysis of a mixture of gases by molecular diffusion including the steps of periodically introducing substantially uniform portions of said mixture into a constantly evacuated elongated zone, periodically removing gas from a region in said zone a substantial distance from the point of ingress of said mixture into said zone, each of said removals of said gas occurring an equal predetermined interval of time after a corresponding introduction of a portion of said mixture into said zone, producing a visual indication directly related to the abundance of said gas periodically removed from said zone, and continuously removing the remainder of said mixture from said zone separate from said gas which is periodically removed from said zone.

3. A method for the analysis of a mixture of gases by molecular diffusion including the steps of continuously removing gas from an evacuated zone, periodically introducing portions of said mixture into said zone at a point remote from the removal point in said zone, each said introduction of a portion of said mixture taking place during a short interval of time, separately removing gas periodically from said zone adjacent said removal point so that each such removal occurs a uniform, predetermined interval of time after the corresponding introduction of said portion of said mixture, and measuring the resultant variation in the pressure of said cyclically removed gas.

4. A method for the analysis of a mixture of unionized gases by molecular diffusion including the steps of continuously removing gas from an evacuated zone, cyclically introducing portions of said mixture into said zone at a point remote from the removal point in said zone, each said introduction of a portion of said mixture taking place during a short interval of time, separately removing unionized gas cyclically from said zone adjacent said removal point into a second zone so that each such removal occurs at a uniform, predetermined interval of time after the corresponding introduction of said portion of said mixture, continuously evacuating said second zone at a point remote from the region of entry of unionized gas into said second zone, separately removing gas cyclically from said second zone adjacent said evacuation point, so that each such removal from said second zone occurs at a uniform, predetermined interval of time after the corresponding introduction of said gas into said second zone, and measuring the resultant variation in the pressure of the gas cyclically removed from said second zone.

5. A method for the analysis of a mixture of unionized gases by molecular diffusion including the steps of continuously removing gas from a plurality of adjacent elongated zones connected in series, periodically introducing portions of said mixture into the first of said plurality of zones, each said introduction of a portion of said mixture taking place during a short interval of time, periodically transferring gas from the end of each such zone to the succeeding zone, each said transference being caused to occur at a uniform, predetermined interval of time after the corresponding introduction of gas into the zone, and measuring the pressure of the gas cyclically transferred into the last of said zones.

6. The method of analyzing a gaseous mixture for at least one of its components including the steps of introducing a portion of one gas of said components in an unionized state into a continuously evacuated zone during a short, predetermined interval of time, without ionizing any of said portion of one gas determining in said zone the resultant variation in pressure at a substantial distance from the region of entry of said portion into said zone as said portion diffuses through said zone, repeating the above steps for other gases of said components, in each case introducing the portion of said other gas only after the preceding portion has been substantially completely eliminated from said zone, introducing separate from the above steps a portion of said mixture into said zone under the same conditions employed in said above steps, and without ionizing any of said portion of said mixture determining in said zone the resultant variation in pressure at a substantial distance from the region of entry of said portion into said zone as said portion of said mixture diffuses through said zone, whereby the variation in pressure determined in said zone after introduction of said portion of said mixture can be compared with the variations in pressure determined under the same conditions for said component gases to determine the relative amounts of said component gases present in said portion of said mixture.

7. A method for concentrating a desired constituent of a mixture of gases including the steps of continuously removing gas from a plurality of adjacent elongated zones connected in series, periodically introducing portions of said mixture into the first of said plurality of zones, each said introduction of a portion of said mixture taking place during a short interval of time, and periodically transferring gas from the end of each such zone to the succeeding zone, each said transference being caused to occur at a uniform, predetermined interval of time after the corresponding introduction of gas into that zone and withdrawing the concentrated desired constituent from the last of said elongated zones in said series.

8. A method for the analysis of a mixture of gases by molecular diffusion including the steps of periodically introducing substantially uniform portions of said mixture into a constantly evacuated zone, periodically removing a gas of substantially uniform molecular weight from a region in said zone a substantial distance from the point of ingress of said mixture into said zone, each of said removals of said gas occurring an equal predetermined interval of time after a corresponding introduction of a portion of said mixture into said zone, producing a visual indication directly related to the partial pressure of said gas periodically removed from said zone, and continuously removing the remainder of said mixture from said zone separate from said gas which is periodically removed from said zone.

ROBERT E. FEARON.

REFERENCES CITED

The following references are of record in the file of this patent:

UNITED STATES PATENTS

| Number | Name | Date |
| --- | --- | --- |
| 1,496,757 | Lewis et al. | June 3, 1924 |
| 1,649,016 | Buckley | Nov. 15, 1927 |
| 2,214,181 | Rylsky | Sept. 10, 1940 |
| 2,341,551 | Hoover, Jr. | Feb. 15, 1944 |

FOREIGN PATENTS

| Number | Country | Date |
| --- | --- | --- |
| 266,396 | Great Britain | Feb. 23, 1927 |

OTHER REFERENCES

Textbook-Physics by Hausmann and Slack, published by Van Nostrand Co., 1935 p. 259.